United States Patent
Ait Aoudia et al.

(10) Patent No.: US 11,483,717 B1
(45) Date of Patent: Oct. 25, 2022

(54) MACHINE LEARNING FOR ORTHOGONAL FREQUENCY-DIVISION MULTIPLEXING BASED COMMUNICATION

(71) Applicant: NOKIA TECHNOLOGIES OY, Espoo (FI)

(72) Inventors: Faycal Ait Aoudia, Saint-Cloud (FR); Jakob Hoydis, Paris (FR); Dani Johannes Korpi, Helsinki (FI); Janne Matti Juhani Huttunen, Espoo (FI); Mikko Johannes Honkala, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/707,448

(22) Filed: Mar. 29, 2022

(30) Foreign Application Priority Data

Mar. 31, 2021 (FI) ..................................... 20215398

(51) Int. Cl.
*H04W 16/00* (2009.01)
*H04W 16/22* (2009.01)
*H04W 72/04* (2009.01)
*G06N 3/04* (2006.01)

(52) U.S. Cl.
CPC .......... *H04W 16/22* (2013.01); *G06N 3/0454* (2013.01); *H04W 72/044* (2013.01)

(58) Field of Classification Search
CPC ... H04W 16/22; H04W 72/044; G06N 3/0454
See application file for complete search history.

(56) References Cited

U.S. PATENT DOCUMENTS

| 10,917,192 | B2 | 2/2021 | Pajovic et al. |
| 2020/0343985 | A1 * | 10/2020 | O'Shea ................ H04B 17/373 |
| 2021/0119713 | A1 * | 4/2021 | O'Shea ................ G06N 20/00 |

FOREIGN PATENT DOCUMENTS

| WO | WO 2018/191309 A1 | 10/2018 |
| WO | WO-2022081114 A1 * | 4/2022 |

OTHER PUBLICATIONS

Office Action dated Sep. 16, 2021 corresponding to Finnish Patent Application No. 20215398.
Finnish Search Report dated Sep. 16, 2021 corresponding to Finnish Patent Application No. 20215398.
Communication of Acceptance—section 29a of Patents Decree dated Dec. 1, 2021 corresponding to Finnish Patent Application No. 20215398.
J. Hoydis et al., "Towards a 6G AI-Native Air Interface," Cornell University, arXiv.org [online], Dec. 15, 2020.
Extended European Search Report dated Aug. 1, 2022 corresponding to European Patent Application No. 221631708.

(Continued)

*Primary Examiner* — Khai M Nguyen
(74) *Attorney, Agent, or Firm* — Squire Patton Boggs (US) LLP

(57) ABSTRACT

Disclosed is a method comprising providing a first resource grid as input to a first machine learning algorithm, obtaining a second resource grid as output from the first machine learning algorithm, and transmitting a signal comprising the second resource grid by using orthogonal frequency-division multiplexing modulation.

4 Claims, 12 Drawing Sheets

(56) References Cited

OTHER PUBLICATIONS

Minhoe Kim et al., "Toward the Realization of Encoder and Decoder Using Deep Neural Networks," Data Science and Artificial Intelligence for Communications, IEEE Communications Magazine, IEEE, vol. 57, No. 5, May 1, 2019, pp. 57-63, XP011724474.
Alexander Felix et al., "OFDM-Autoencoder for End-to-End Learning of Communications Systems," 2018 IEEE 19th International Workshop on Signal Processing Advances in Wireless Communications (SPAWC), IEEE, Jun. 25, 2018, pp. 1-5, XP033391777.

* cited by examiner

US 11,483,717 B1

MACHINE LEARNING FOR ORTHOGONAL FREQUENCY-DIVISION MULTIPLEXING BASED COMMUNICATION

FIELD

The following exemplary embodiments relate to wireless communication.

BACKGROUND

In wireless communications, waveforms specify how a radio signal is modulated to carry information. For example, orthogonal frequency-division multiplexing (OFDM) may be used as a waveform. As resources are limited, it is desirable to improve the performance of OFDM-based wireless communication systems to enable better usage of resources.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: provide a first resource grid as input to a first machine learning algorithm; obtain a second resource grid as output from the first machine learning algorithm; and transmit a signal comprising the second resource grid by using orthogonal frequency-division multiplexing modulation.

According to another aspect, there is provided an apparatus comprising means for: providing a first resource grid as input to a first machine learning algorithm; obtaining a second resource grid as output from the first machine learning algorithm; and transmitting a signal comprising the second resource grid by using orthogonal frequency-division multiplexing modulation.

According to another aspect, there is provided a method comprising: providing a first resource grid as input to a first machine learning algorithm; obtaining a second resource grid as output from the first machine learning algorithm; and transmitting a signal comprising the second resource grid by using orthogonal frequency-division multiplexing modulation.

According to another aspect, there is provided a computer program comprising instructions for causing an apparatus to perform at least the following: provide a first resource grid as input to a first machine learning algorithm; obtain a second resource grid as output from the first machine learning algorithm; and transmit a signal comprising the second resource grid by using orthogonal frequency-division multiplexing modulation.

According to another aspect, there is provided a computer readable medium comprising program instructions for causing an apparatus to perform at least the following: provide a first resource grid as input to a first machine learning algorithm; obtain a second resource grid as output from the first machine learning algorithm; and transmit a signal comprising the second resource grid by using orthogonal frequency-division multiplexing modulation.

According to another aspect, there is provided a non-transitory computer readable medium comprising program instructions for causing an apparatus to perform at least the following: provide a first resource grid as input to a first machine learning algorithm; obtain a second resource grid as output from the first machine learning algorithm; and transmit a signal comprising the second resource grid by using orthogonal frequency-division multiplexing modulation.

According to another aspect, there is provided an apparatus comprising at least one processor, and at least one memory including computer program code, wherein the at least one memory and the computer program code are configured, with the at least one processor, to cause the apparatus to: receive a signal comprising a second resource grid; obtain the second resource grid from the received signal by using orthogonal frequency-division multiplexing demodulation; provide the second resource grid as input to a second machine learning algorithm; and obtain a first resource grid as output from the second machine learning algorithm.

According to another aspect, there is provided an apparatus comprising means for: receiving a signal comprising a second resource grid; obtain the second resource grid from the received signal by using orthogonal frequency-division multiplexing demodulation; providing the second resource grid as input to a second machine learning algorithm; and obtaining a first resource grid as output from the second machine learning algorithm.

According to another aspect, there is provided a method comprising: receiving a signal comprising a second resource grid; obtain the second resource grid from the received signal by using orthogonal frequency-division multiplexing demodulation; providing the second resource grid as input to a second machine learning algorithm; and obtaining a first resource grid as output from the second machine learning algorithm.

According to another aspect, there is provided a computer program comprising instructions for causing an apparatus to perform at least the following: receive a signal comprising a second resource grid; obtain the second resource grid from the received signal by using orthogonal frequency-division multiplexing demodulation; provide the second resource grid as input to a second machine learning algorithm; and obtain a first resource grid as output from the second machine learning algorithm.

According to another aspect, there is provided a computer readable medium comprising program instructions for causing an apparatus to perform at least the following: receive a signal comprising a second resource grid; obtain the second resource grid from the received signal by using orthogonal frequency-division multiplexing demodulation; provide the second resource grid as input to a second machine learning algorithm; and obtain a first resource grid as output from the second machine learning algorithm.

According to another aspect, there is provided a non-transitory computer readable medium comprising program instructions for causing an apparatus to perform at least the following: receive a signal comprising a second resource grid; obtain the second resource grid from the received signal by using orthogonal frequency-division multiplexing demodulation; provide the second resource grid as input to a second machine learning algorithm; and obtain a first resource grid as output from the second machine learning algorithm.

According to another aspect, there is provided an apparatus comprising at least one processor, and at least one memory including computer program code, wherein the at least one memory and the computer program code are configured, with the at least one processor, to cause the apparatus to: initialize a first set of parameters associated with a first artificial neural network and a second set of parameters associated with a second artificial neural network; generate a batch of bits; obtain a set of output values from the second artificial neural network based at least partly on the batch of bits, the first set of parameters, and the second set of parameters by performing at least one forward pass for the batch of bits in the first artificial neural network and in the second artificial neural network; determine a loss function based at least partly on the set of output values; and update the first set of parameters and the second set of parameters by determining a gradient of the loss function relative to the first set of parameters and the second set of parameters, and applying at least one step of stochastic gradient descent to the gradient.

According to another aspect, there is provided an apparatus or a system comprising means for: initializing a first set of parameters associated with a first artificial neural network and a second set of parameters associated with a second artificial neural network; generating a batch of bits; obtaining a set of output values from the second artificial neural network based at least partly on the batch of bits, the first set of parameters, and the second set of parameters by performing at least one forward pass for the batch of bits in the first artificial neural network and in the second artificial neural network; determining a loss function based at least partly on the set of output values; and updating the first set of parameters and the second set of parameters by determining a gradient of the loss function relative to the first set of parameters and the second set of parameters, and applying at least one step of stochastic gradient descent to the gradient.

According to another aspect, there is provided a method comprising: initializing a first set of parameters associated with a first artificial neural network and a second set of parameters associated with a second artificial neural network; generating a batch of bits; obtaining a set of output values from the second artificial neural network based at least partly on the batch of bits, the first set of parameters, and the second set of parameters by performing at least one forward pass for the batch of bits in the first artificial neural network and in the second artificial neural network; determining a loss function based at least partly on the set of output values; and updating the first set of parameters and the second set of parameters by determining a gradient of the loss function relative to the first set of parameters and the second set of parameters, and applying at least one step of stochastic gradient descent to the gradient.

According to another aspect, there is provided a computer program comprising instructions for causing an apparatus to perform at least the following: initialize a first set of parameters associated with a first artificial neural network and a second set of parameters associated with a second artificial neural network; generate a batch of bits; obtain a set of output values from the second artificial neural network based at least partly on the batch of bits, the first set of parameters, and the second set of parameters by performing at least one forward pass for the batch of bits in the first artificial neural network and in the second artificial neural network; determine a loss function based at least partly on the set of output values; and update the first set of parameters and the second set of parameters by determining a gradient of the loss function relative to the first set of parameters and the second set of parameters, and applying at least one step of stochastic gradient descent to the gradient.

According to another aspect, there is provided a computer readable medium comprising program instructions for causing an apparatus to perform at least the following: initialize a first set of parameters associated with a first artificial neural network and a second set of parameters associated with a second artificial neural network; generate a batch of bits; obtain a set of output values from the second artificial neural network based at least partly on the batch of bits, the first set of parameters, and the second set of parameters by performing at least one forward pass for the batch of bits in the first artificial neural network and in the second artificial neural network; determine a loss function based at least partly on the set of output values; and update the first set of parameters and the second set of parameters by determining a gradient of the loss function relative to the first set of parameters and the second set of parameters, and applying at least one step of stochastic gradient descent to the gradient.

According to another aspect, there is provided a non-transitory computer readable medium comprising program instructions for causing an apparatus to perform at least the following: initialize a first set of parameters associated with a first artificial neural network and a second set of parameters associated with a second artificial neural network; generate a batch of bits; obtain a set of output values from the second artificial neural network based at least partly on the batch of bits, the first set of parameters, and the second set of parameters by performing at least one forward pass for the batch of bits in the first artificial neural network and in the second artificial neural network; determine a loss function based at least partly on the set of output values; and update the first set of parameters and the second set of parameters by determining a gradient of the loss function relative to the first set of parameters and the second set of parameters, and applying at least one step of stochastic gradient descent to the gradient.

According to another aspect, there is provided a system comprising at least a first apparatus and a second apparatus. The first apparatus is configured to: provide a first resource grid as input to a first machine learning algorithm; obtain a second resource grid as output from the first machine learning algorithm; and transmit, to the second apparatus, a signal comprising the second resource grid by using orthogonal frequency-division multiplexing modulation. The second apparatus is configured to: receive, from the first apparatus, the signal comprising the second resource grid; obtain the second resource grid from the received signal by using orthogonal frequency-division multiplexing demodulation; provide the second resource grid as input to a second machine learning algorithm; and obtain the first resource grid as output from the second machine learning algorithm.

According to another aspect, there is provided a system comprising at least a first apparatus and a second apparatus. The first apparatus comprises means for: providing a first resource grid as input to a first machine learning algorithm; obtaining a second resource grid as output from the first machine learning algorithm; and transmitting, to the second apparatus, a signal comprising the second resource grid by using orthogonal frequency-division multiplexing modulation. The second apparatus comprises means for: receiving, from the first apparatus, the signal comprising the second resource grid; obtaining the second resource grid from the received signal by using orthogonal frequency-division multiplexing demodulation; providing the second resource grid as input to a second machine learning algorithm; and obtaining the first resource grid as output from the second machine learning algorithm.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
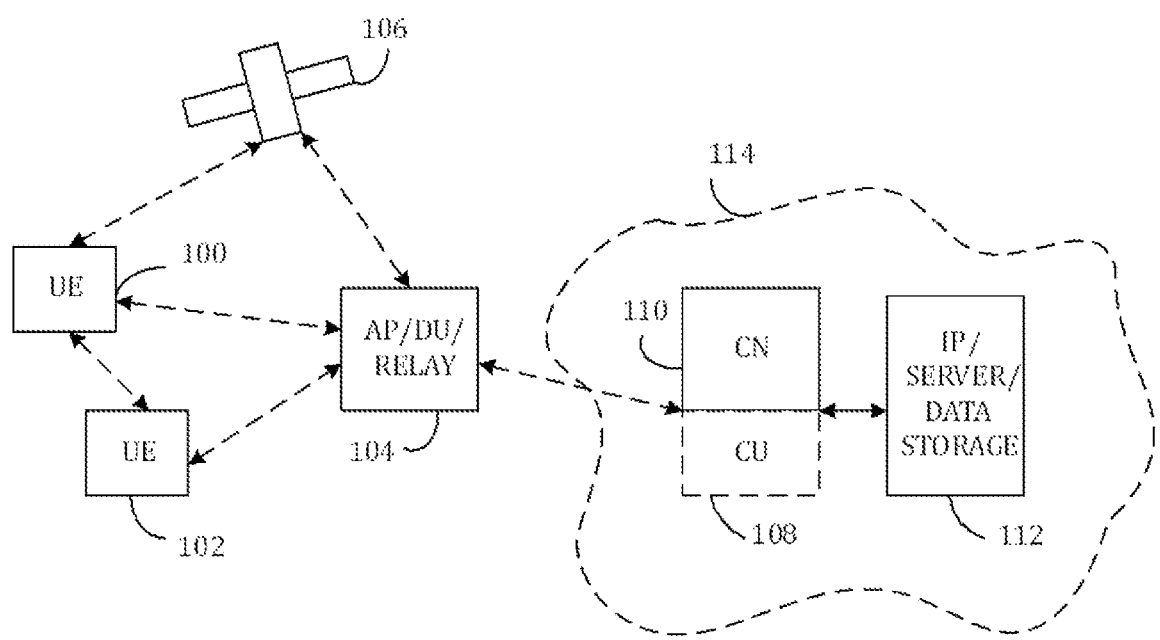
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The NodeB may also be referred to as a base station, an access point or any other type of interfacing device including a relay station capable of operating in a wireless environment. The (e/g) NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G may enable using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a centralized unit, CU 108) may be enabled for example by application of cloudRAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g)nodeB.

Furthermore, the (e/g)nodeB or base station may also be split into: a radio unit (RU) comprising a radio transceiver (TRX), i.e. a transmitter (TX) and a receiver (RX); a distributed unit (DU) that may be used for the so-called Layer 1 (L1) processing and real-time Layer 2 (L2) processing; and a centralized unit (CU) or a central unit that may be used for non-real-time L2 and Layer 3 (L3) processing. Such a split may enable the centralization of CUs relative to the cell sites and DUs, whereas DUs may be more distributed and may even remain at cell sites. The CU and DU together may also be referred to as baseband or a baseband unit (BBU). The RU and DU may also be comprised into a radio access point (RAP). Cloud computing platforms may also be used to run the CU or DU. The CU may run in a cloud computing platform (vCU, virtualized CU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be needed to provide such a network structure.

For fulfilling the need for improving the deployment and performance of communication systems, the concept of "plug-and-play" (e/g)NodeBs may be introduced. A network which may be able to use "plug-and-play" (e/g)Node Bs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

In wireless communications, waveforms specify how the radio signal is modulated to carry information. Waveforms control the shape of the signal and most of its signal-processing features, such as spectral and time containment, peak-to-average power ratio (PAPR), and spectral efficiency. In most wireless communication standards, including 4G, 5G and WiFi, orthogonal frequency-division multiplexing (OFDM) is used as a waveform as its modulation and demodulation are of relatively low complexity, it allows for single-tap equalization, and it facilitates multiplexing due to granular access to the frequency domain.

Figure 2:
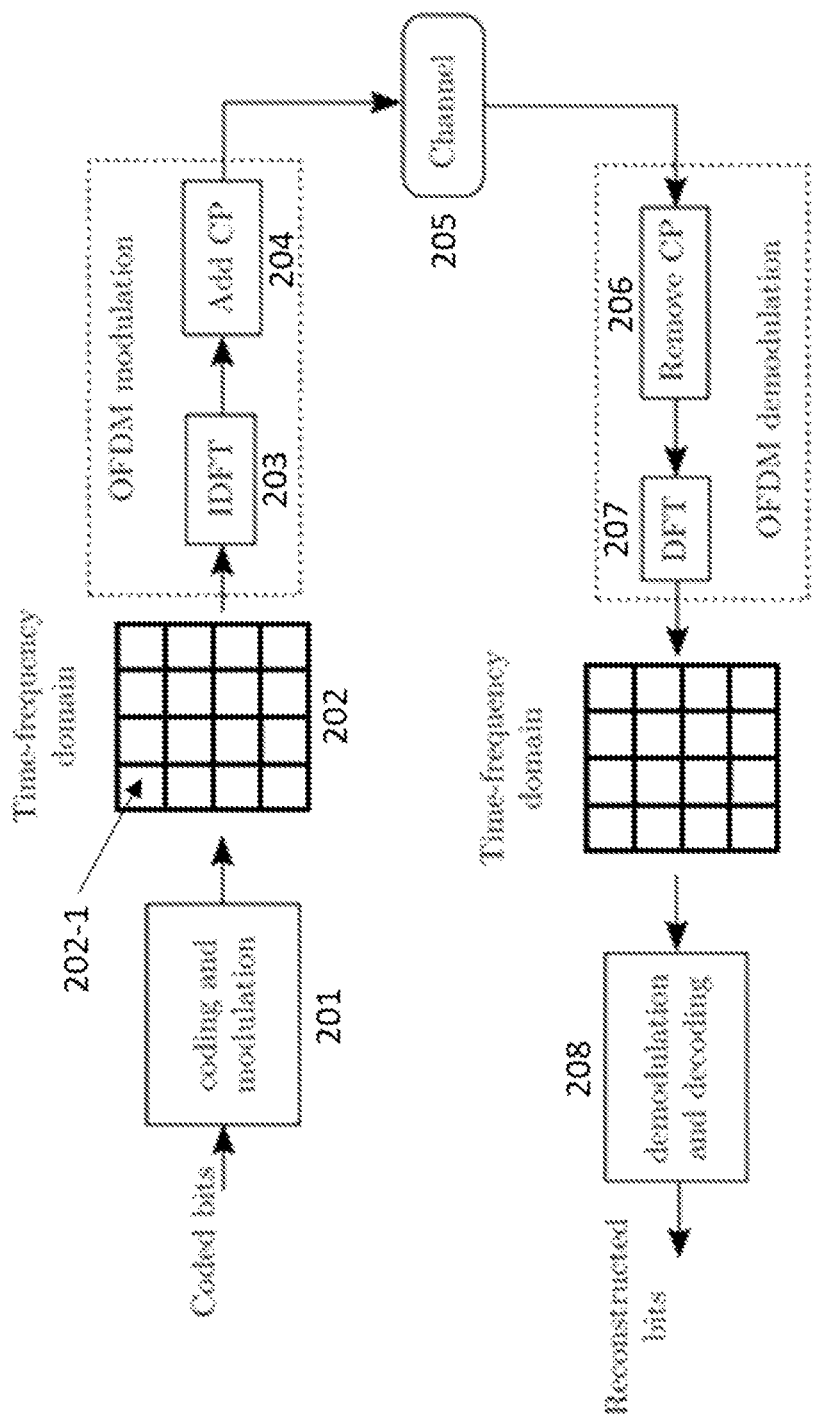
FIG. 2 illustrates a simplified architecture of an orthogonal frequency-division multiplexing communication system.

FIG. 2 illustrates a simplified architecture of an OFDM communication system. Data-carrying symbols are modulated 201 in the time-frequency domain, forming a resource grid (RG) 202. A cell of a resource grid is referred to as a resource element (RE) 202-1. In other words, a resource grid may comprise a plurality of resource elements. A resource element may comprise, for example, one subcarrier in the frequency domain and one OFDM symbol in the time domain.

Data symbols assigned to different frequencies are carried by orthogonal subcarriers, and the radio signal is generated through an inverse discrete Fourier transform (IDFT) 203. A cycling prefix (CP) is added 204 to avoid inter-symbol interference (ISI). Upon receiving the radio signal over the wireless channel 205, the receiver then performs the reverse operations 206, 207, 208 to reconstruct the transmitted symbols in the time-frequency domain. In other words, the receiver removes 206 the CP, performs a discrete Fourier transform (DFT) 207 on the received radio signal, as well as demodulates and decodes 208 the symbols.

Some wireless OFDM-based systems modulate data in the time-frequency domain, which may negatively affect the error rate performance, as different parts of the resource grid may experience different fading. For example, some sub carriers might experience particularly strong fading. In addition to limiting the spectral efficiency, such tempo-spectral variations in the channel condition make the task of link adaptation and scheduling more difficult, as it must consider these variations, when scheduling users and deciding on the modulation and coding scheme (MCS). Also, fast-varying channels may create inter-sub carrier interference and make channel estimation and equalization difficult tasks.

Some exemplary embodiments provide a machine learning algorithm for learning a scheme that spreads the modulated data symbols over the entire time-frequency resource grid. More precisely, the resource grid of data symbols is fed to an algorithm with trainable parameters, which determines a resource grid of time-frequency symbols that is then transmitted through OFDM. The trainable algorithm can spread a given data symbol over the entire available tempo-spectral resources, which therefore benefits from the diversity offered by the entire time-frequency grid. In addition, this freedom allows the transmitter to alter the sent symbols in other ways that may be beneficial for the radio performance. On the receiver side, a second algorithm with trainable parameters reconstructs the data symbols from the received time-frequency grid, computed by the OFDM demodulator. Some exemplary embodiments may be based on end-to-end learning of the physical layer of wireless communication systems, which consists of jointly learning a transmitter and a receiver over a pre-defined channel model.

Figure 3:
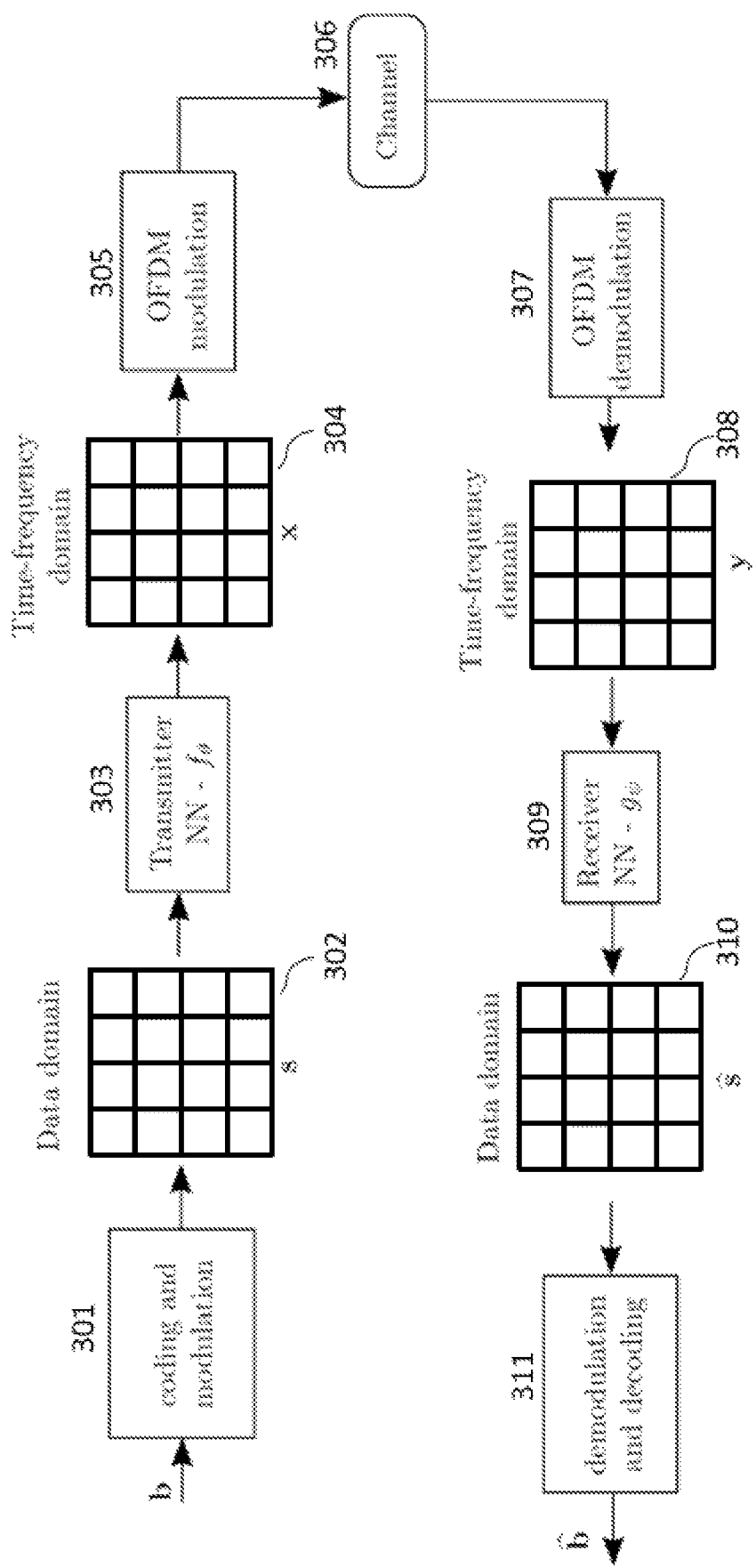
FIGS. 3-8 illustrate simplified architectures according to some exemplary embodiments.

FIG. 3 illustrates a simplified architecture of a system according to an exemplary embodiment. Information-carrying bits b are coded and modulated 301 using, for example, low-density parity-check code (LDPC) and quadrature amplitude modulation (QAM) to generate a resource grid 302 of data-carrying symbols s in the data domain. This resource grid of symbols of size N×M, where M and N denote the number of OFDM symbols and subcarriers, respectively, that form the time-frequency resource grid, is fed to a first algorithm 303, denoted by $f_\theta$, with trainable parameters, where $\theta$ is the set of trainable parameters of the first algorithm. The first algorithm $f_\theta$ may be, for example, an artificial neural network (NN). The first algorithm 303 outputs a resource grid 304 of symbols in the time-frequency domain x. The output symbols are then transmitted over the wireless channel 306 through OFDM modulation 305.

At the receiver side, OFDM demodulation 307 is performed on the received signal to reconstruct a resource grid 308 of (distorted) time-frequency symbols y, which are fed to a second trainable algorithm 309, such as an artificial neural network, which reconstructs the data symbols, denoted as ŝ, in the data-domain resource grid 310. This second algorithm 309 is denoted by $g_\psi$, where $\psi$ is the set of trainable parameters of the second algorithm. The data symbols can then be demodulated and decoded 311. The neural networks at the transmitter and receiver may be jointly optimized for a given channel model by using deep learning training techniques, for example.

Figure 4:
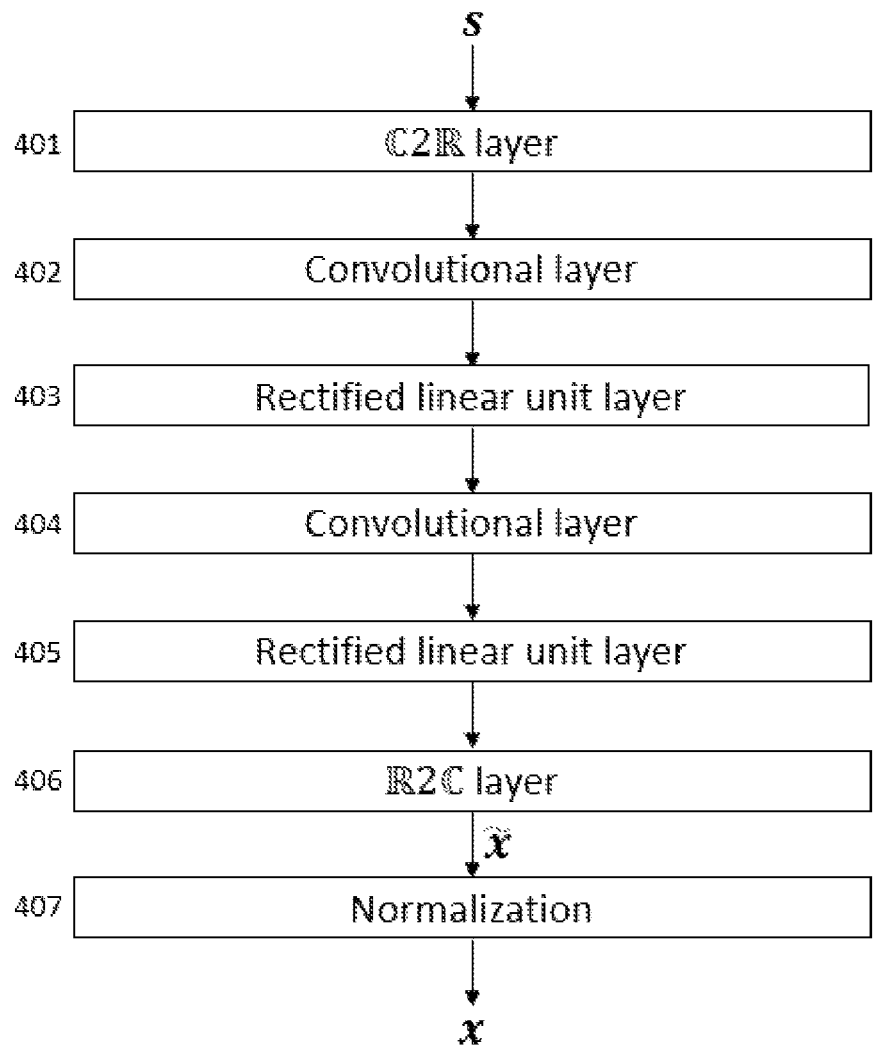

FIG. 4 illustrates a simplified architecture of an artificial neural network at the transmitter according to an exemplary embodiment. FIG. 4 shows a possible architecture for the first artificial neural network implementing $f_\theta$ that generates a resource grid of time-frequency symbols from a resource grid of data symbols s. The first layer 401 may be a $\mathbb{R}2$ $\mathbb{C}$ layer that converts the complex data symbols s to real scalar values, for example by stacking their real and imaginary parts onto an additional dimension. A plurality of convolutional layers 402, 404 may then be utilized, as they may be well suited to the processing of two-dimensional (2D) data. Although only two convolutional layers are depicted in FIG. 4, it should be noted that the artificial neural network may also comprise more than two convolutional layers. The convolutional layers perform a 2D convolution on a 2D input. The input of the convolutional layers may have multiple channels, such as a real and imaginary part of a baseband signal in this case. For example, the last convolutional layer 404 may have two channels, corresponding to the real and imaginary parts of the time-frequency complex symbols. The set of trainable parameters may comprise the weight values of the convolution kernel. A non-linearity may be applied after the convolution, for example by using a rectified linear unit (ReLU) layer 403, 405 after each convolutional layer. ReLU may also be referred to as a rectified linear activation function. The one or more ReLU layers may apply a convolutional filter followed by element-wise non-linearity to the real scalar values. A $\mathbb{R}\,2\mathbb{C}$ layer 406 may then be utilized to perform a reverse process compared to the $\mathbb{C}\,2\mathbb{R}$ layer, i.e. to convert the real scalar values to time-frequency complex symbols $\tilde{x}$. Finally, the last layer 407 may be a normalization layer to ensure that some energy constraint is fulfilled, for example $\mathbb{E}\,[|x|^2]=1$, by performing for example:

$$x_{i,j} = \frac{\tilde{x}_{i,j}}{\sqrt{\frac{\sum_{k,l}|\tilde{x}_{k,l}|^2}{MN}}}, 1 \le i \le M, 1 \le j \le N$$

where the subscript i,j refers to the (i,j) resource element of a resource grid.

Figure 5:
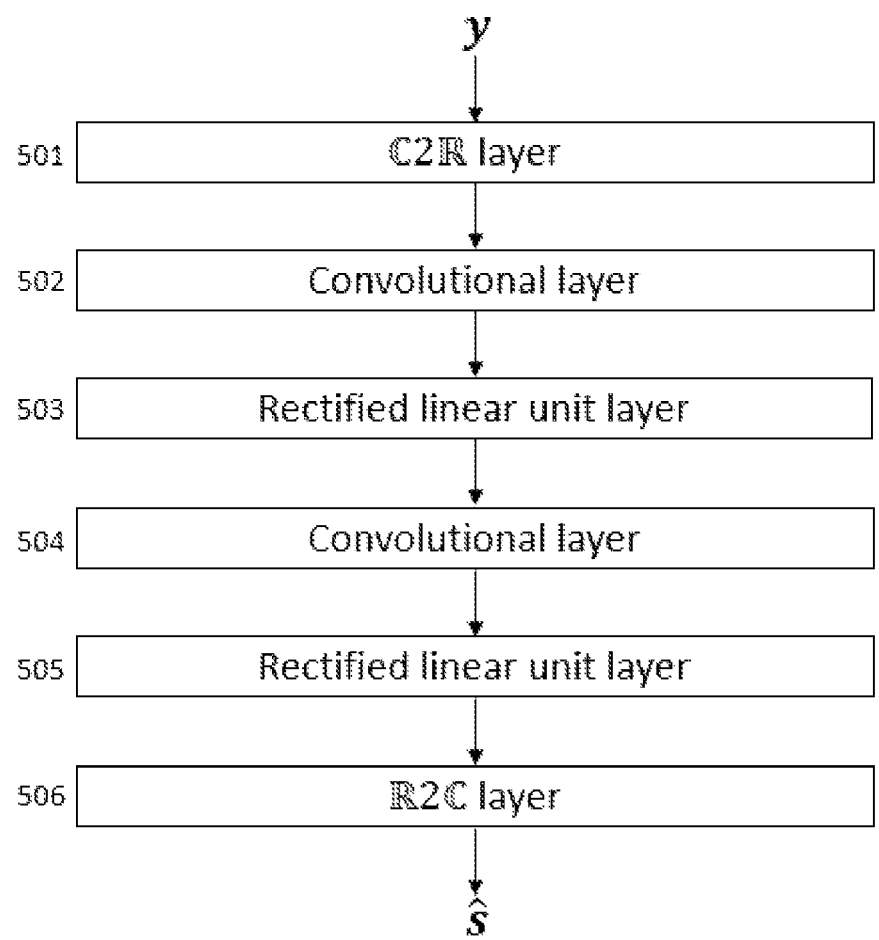

FIG. 5 illustrates a simplified architecture of a neural network at the receiver according to an exemplary embodiment. FIG. 5 shows a possible architecture for the second artificial neural network implementing $g_\psi$. Similarly to $f_\theta$ in FIG. 4, the first layer 501 may be a $\mathbb{C}\,2\mathbb{R}$ layer that converts the complex inputs y into real ones. A plurality of convolutional layers 502, 504 may be utilized here as well. Although only two convolutional layers are depicted in FIG. 5, it should be noted that the artificial neural network may also comprise more than two convolutional layers. The last convolutional layer 504 may have two channels, corresponding to the real and imaginary parts of the data domain symbols. A non-linearity may be applied after the convolution, for example by using a ReLU layer 503, 505 after each convolutional layer. The last layer 506 may be a $\mathbb{R}\,2\mathbb{C}$ layer that converts the real values to complex data symbols $\hat{s}$. No normalization layer may be needed here, as the second neural network may be trained to reconstruct the data symbols s, which have bounded average energy.

It should be noted that the $\mathbb{C}\,2\mathbb{R}$ and $\mathbb{R}\,2\mathbb{C}$ conversions are optional. In some exemplary embodiments, the neural networks may be implemented using complex convolutions, for example.

It should also be noted that the architectures shown in FIGS. 4 and 5 are only a non-limiting example. Some exemplary embodiments may be based on other architectures, such as a residual neural network (ResNet) structure. For example, instead of or in addition to convolutional layers, the artificial neural network may comprise one or more residual layers, one or more attention layers, and/or one or more transformers.

It should also be noted that the resource grid in the data domain and the resource grid in the time-frequency domain are not required to be of the same dimension. Furthermore, the neural networks may be trained offline, prior to deployment, using the training procedure depicted in FIG. 9. Once trained, the neural networks may be deployed at the transmitter and receiver, potentially with a fine-tuning training in the practical environment.

Reference signals, which may also be referred to as pilots, may be used by some communication systems to estimate the channel response and enable reconstruction of the transmitted data. In some OFDM systems, reference signals may be allocated to part of the resource elements in the time-frequency resource grid according to some pre-defined patterns. In some exemplary embodiments, the reference signal may be allocated to specific resource elements either in the time-frequency resource grid or in the data resource grid.

Figure 6:
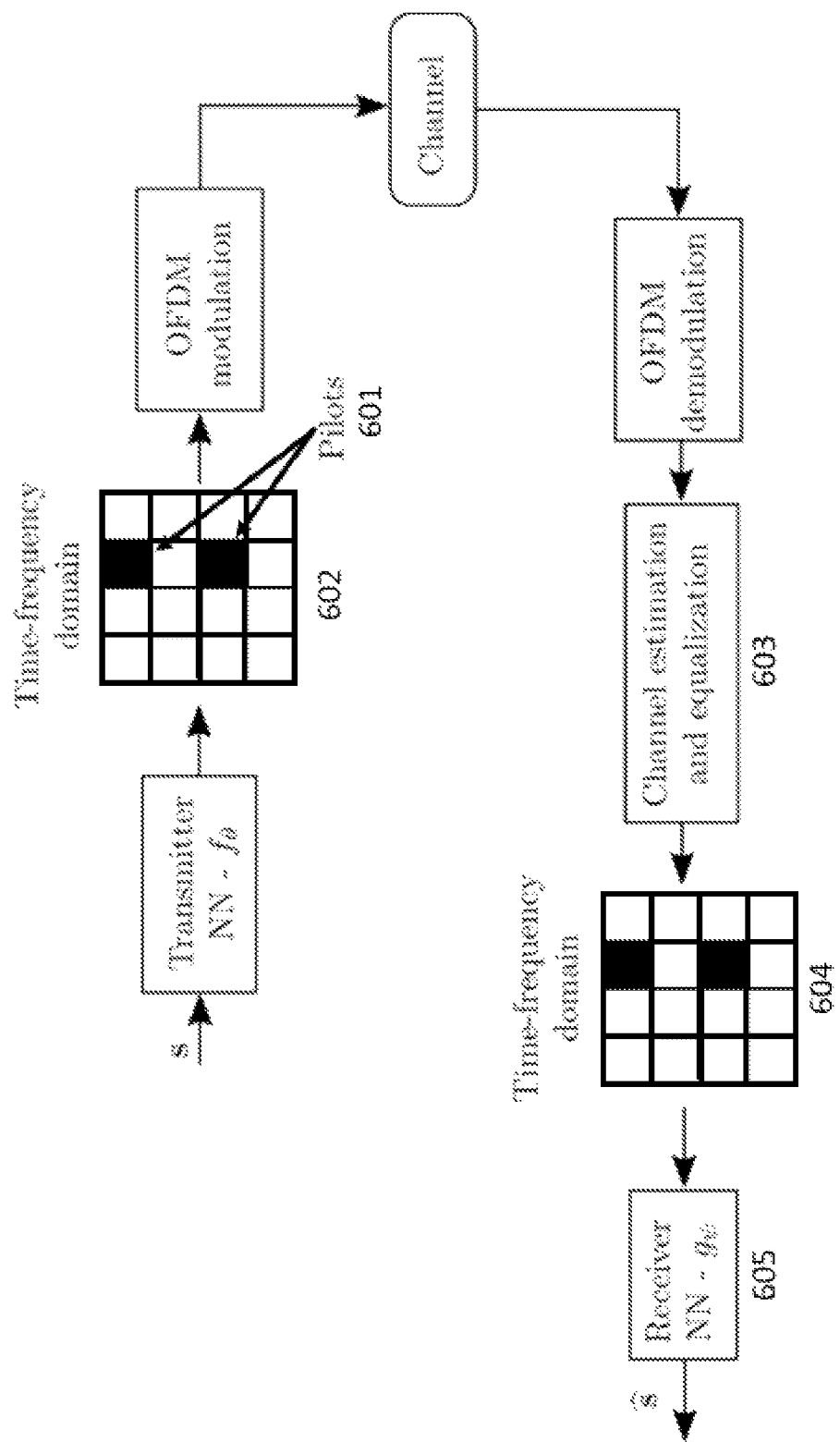

FIG. 6 illustrates a simplified architecture according to an exemplary embodiment. If one or more reference signals 601 are allocated in the time-frequency domain resource grid 602 at the transmitter, then the receiver may perform channel estimation and equalization 603 on the resource grid in the time-frequency domain, and the equalized time-frequency resource grid 604 may be provided as input to $g_\psi$, i.e. the receiver neural network 605, as illustrated in FIG. 6. It should be noted that FIG. 6 only illustrates a part of the end-to-end system for simplicity.

Figure 7:
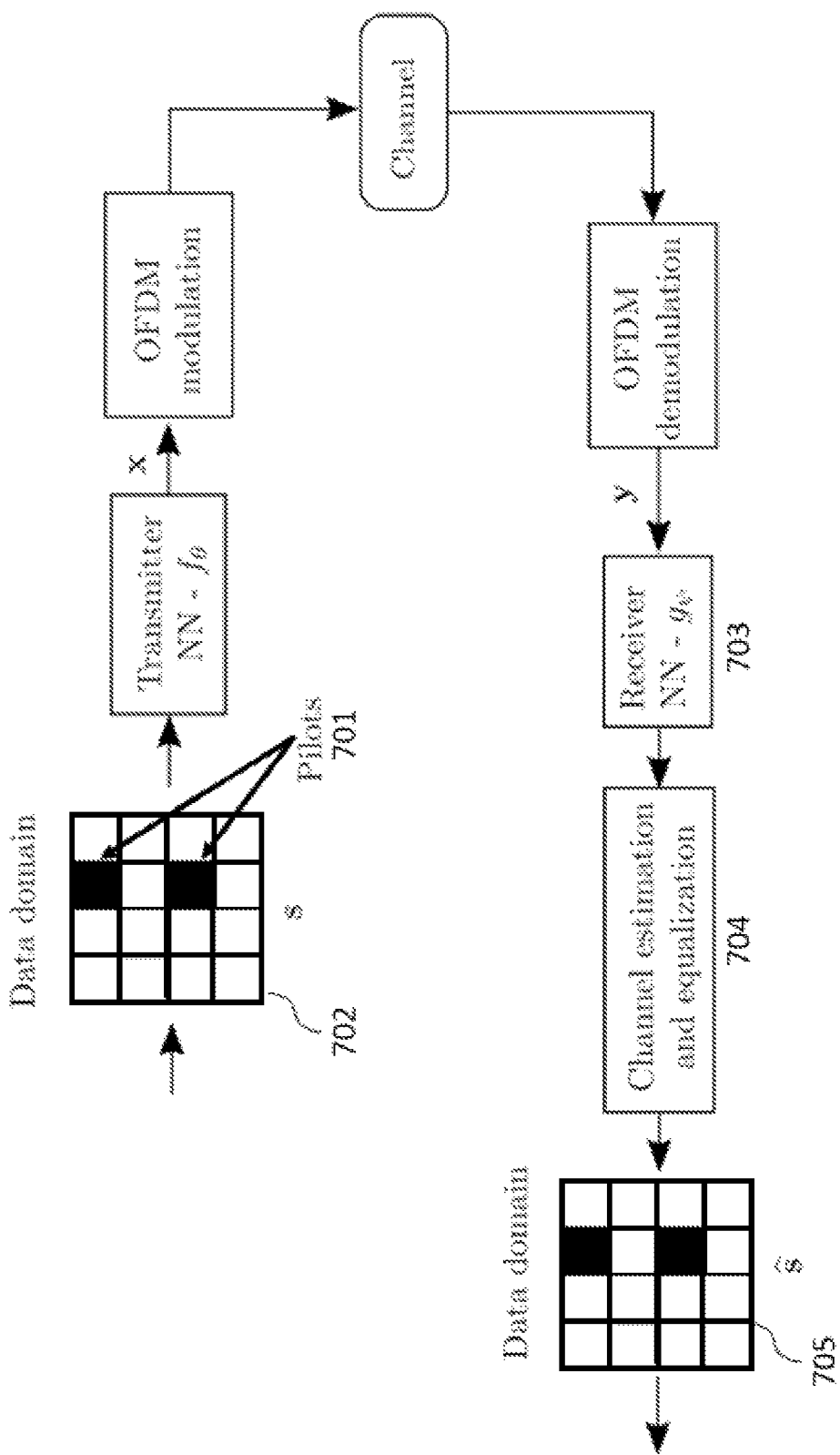

FIG. 7 illustrates a simplified architecture according to another exemplary embodiment. If one or more reference signals 701 are allocated in the data domain resource grid 702 at the transmitter, then the receiver may perform channel estimation and equalization 704 on the resource grid 705 in the data domain, which is obtained as output from the receiver neural network 703, as illustrated in FIG. 7. It should be noted that FIG. 7 only illustrates a part of the end-to-end system for simplicity.

Figure 8:
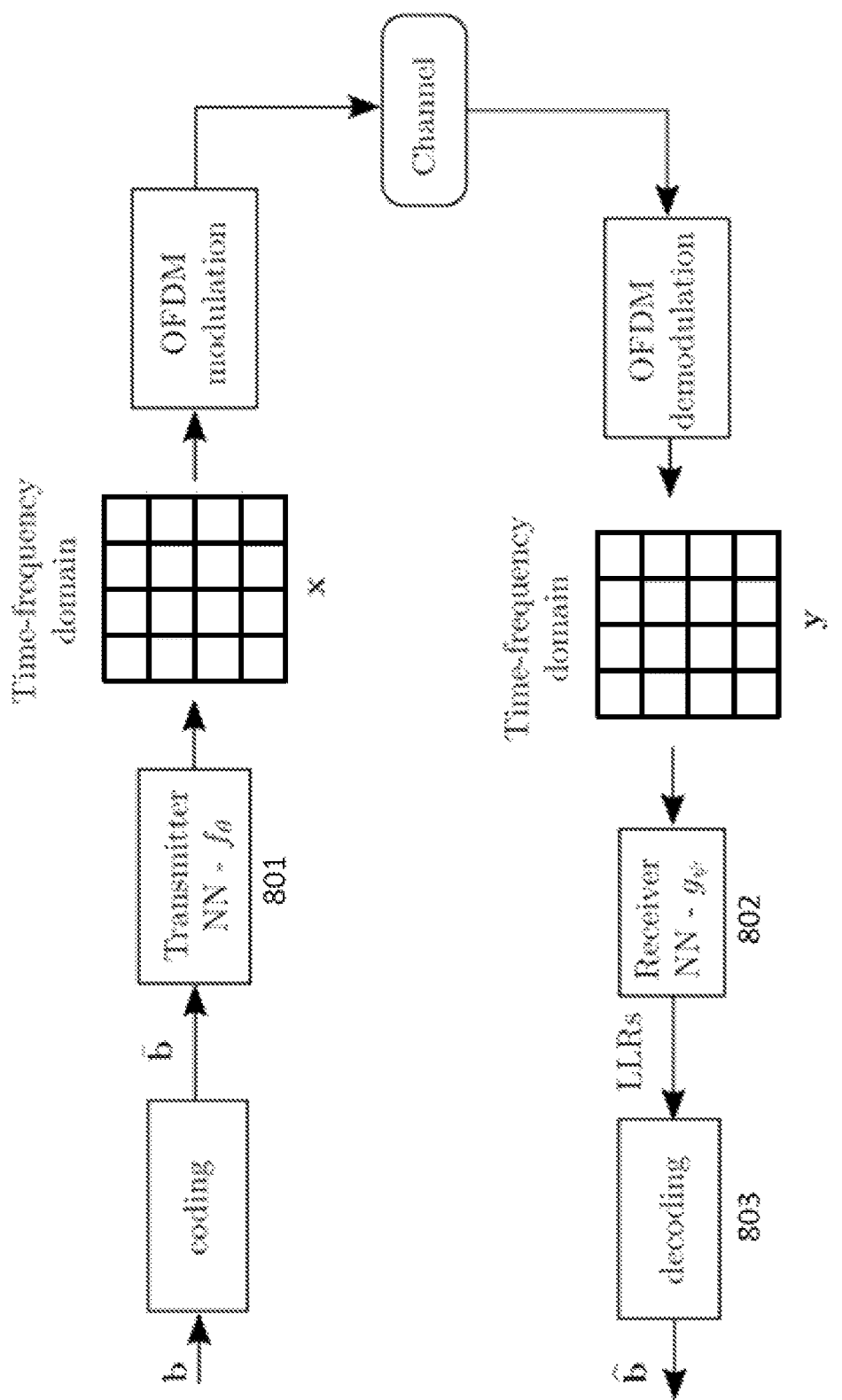

In another exemplary embodiment, the first algorithm at the transmitter may be fed with coded bits instead of modulated data symbols. In addition, the second algorithm at the receiver may output log-likelihood ratios (LLRs) that may serve as input to the channel decoder. FIG. 8 illustrates a simplified architecture according to an exemplary embodiment, wherein the transmitter and receiver neural network operate on bits instead of operating on modulated symbols. In this case, the transmitter neural network 801, i.e. $f_\theta$, may be fed with unmodulated coded bits $\bar{b}$, whereas the receiver neural network 802 may output LLRs that may then be fed to a channel decoder 803. The input of $f_\theta$ may be of shape M×N×K, where K denotes the number of bits per channel (for example K=4 for a 16-QAM). As described previously, M and N denote the number of OFDM symbols and subcarriers, respectively, that form the time-frequency resource grid. The output of $g_\psi$ may have the same shape as the input of $f_\theta$.

Architectures similar to the ones shown in FIGS. 4 and 5 may also be used for operating on bits instead of modulated symbols, but without the $\mathbb{C}\,2\mathbb{R}$ layer 401 at the input of $f_\psi$ in FIG. 4, and without the $\mathbb{R}\,2\mathbb{C}$ layer 504 at the output of $g_\psi$ in FIG. 5.

A benefit of OFDM is the ease of multiplexing multiple users or streams enabled by granular access to time and frequency. In some exemplary embodiments, multiplexing may be achieved either in the time-frequency domain or in the data domain with similar ease. In the case of time-frequency domain, some exemplary embodiments may co-exist with legacy systems. However, if resources are allocated in the data domain, then the other transmitters should schedule resources in a compatible manner, as the neural network may distribute the orthogonally scheduled data domain resources over the whole time-frequency grid.

Figure 9:
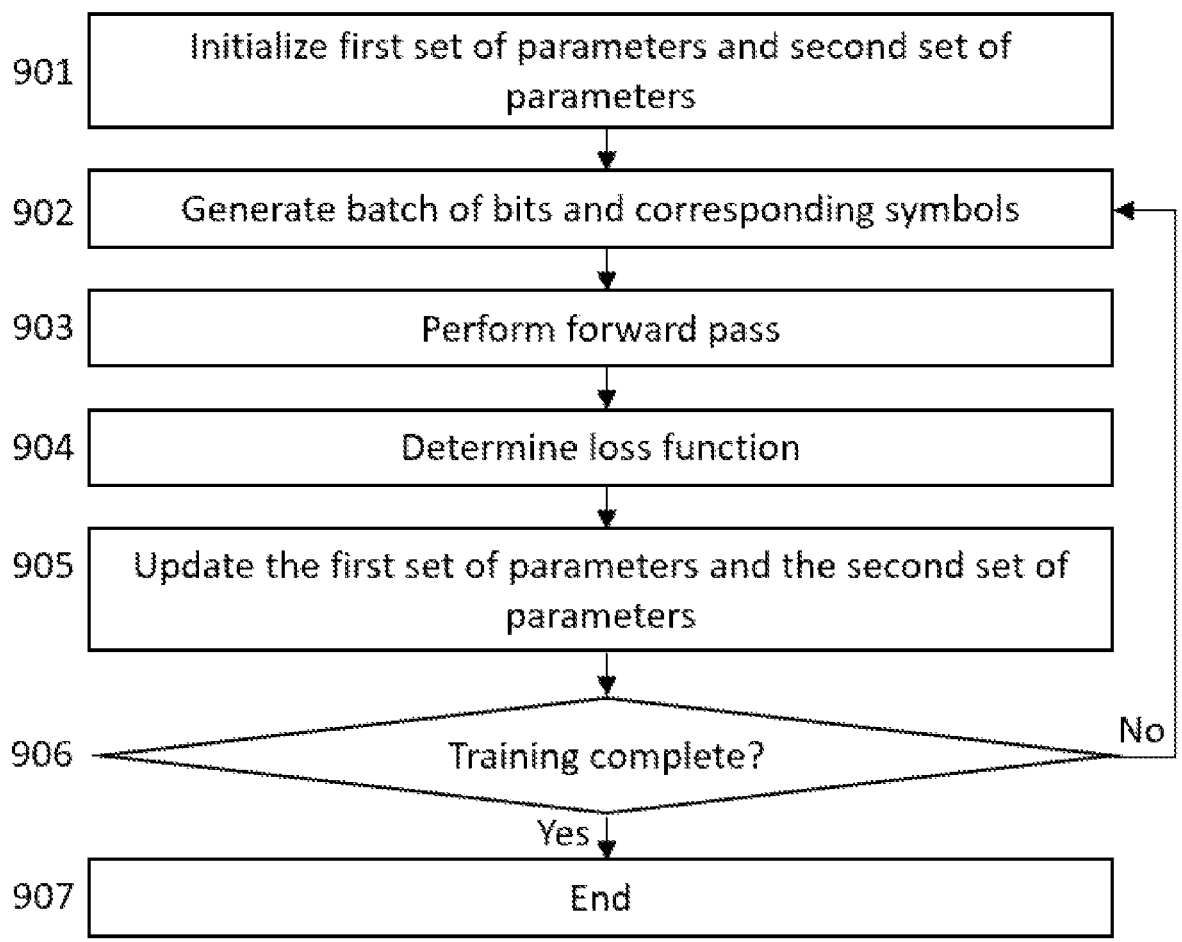
FIGS. 9-11 illustrate flow charts according to some exemplary embodiments.

FIG. 9 illustrates a flow chart according to an exemplary embodiment, wherein a training procedure may be utilized to jointly optimize $f_\theta$ and $g_\psi$, in an end-to-end manner. This training procedure assumes that the channel model is differentiable with respect to the input, i.e. OFDM modulated signal. The training procedure may be performed, for example, by using the system illustrated in FIG. 3.

Referring to FIG. 9, a first set of trainable parameters, i.e. $\theta$, and a second set of trainable parameters, i.e. $\psi$, are initialized 901 for example with random values. B tensors of bits with dimensions M×N×K ($b^{(1)}$, ..., $b^{(B)}$) and a corresponding resource grid of modulated data symbols ($s^{(1)}$, ..., $s^{(B)}$) are generated 902 for example randomly, where B is the batch size. At least one forward pass per batch example is performed 903 for example in the end-to-end system illustrated in FIG. 3. Forward pass refers to evaluating the model using an input sample, or a batch of samples.

In the forward pass 903, coded bits may be randomly sampled, forming a batch of resource grids. The coded bits may be modulated using for example QAM to form a batch of resource grids of modulated symbols. The batch of resource grids may be provided to the first neural network at the transmitter to generate a batch of resource grids in the time-frequency domain. OFDM modulation (IDFT+add CP) of the batch of resource grids may be performed in the time-frequency domain. The symbols may then be transmitted to the receiver over the channel. On the receiver side, OFDM demodulation (CP removal+DFT) may be performed to get a batch of resource grids in the time-frequency domain. The batch of resource grids in the time-frequency domain may be provided to the second neural network at the receiver to obtain a batch of resource grids in the data domain (for example QAM symbols). The QAM symbols may be demapped to obtain a set of LLRs. The set of LLRs may also be referred to as a set of output values herein. These LLRs, which are equivalent to binary probabilities, may then be used to compute the loss function.

The loss function may be determined 904, for example by computing:

$$L(\theta, \psi) = -\frac{1}{B}\sum_{b=1}^{B}\sum_{m=1}^{M}\sum_{n=1}^{N}\sum_{k=1}^{K}\left(b_{m,n,k}^{(b)}\log\left(\tilde{P}\left(b_{m,n,k}^{(b)}=1 \mid y^{(b)}\right)\right) + \left(1-b_{m,n,k}^{(b)}\right)\log\left(1-\tilde{P}\left(b_{m,n,k}^{(b)}=1 \mid y^{(b)}\right)\right)\right)$$

where $b_{m,n,k}^{(b)}$ is the $k^{th}$ bit generated for the resource element (m, n) and for the $b^{th}$ batch example, $y^{(b)}$ is the channel output for the $b^{th}$ batch example, and $\tilde{P}(b_{m,n,k}^{(b)}=1|y^{(b)})$ is the probability estimated by the receiver that $b_{m,n,k}^{(b)}=1$ given the channel output $y^{(b)}$. The probability can be obtained for example by applying the sigmoid function to the LLRs. $\theta$ and $\psi$ are updated 905 by determining the gradient of L ($\theta$, $\psi$) relative to $\theta$ and $\psi$, and applying at least one step of stochastic gradient descent (SGD), for example. Other variants of SGD, such as ADAM or LAMB, may also be used. If the training procedure is determined to be completed (906: yes), then the training procedure may end 907. Alternatively, if the training procedure is not completed (906: no), then the process may return to block 902 and continue from there. For example, the training procedure may be determined 906 to be completed after a pre-defined number of iterations, or when the loss function has not decreased for a pre-defined number of iterations.

It should be noted that the learning rate, batch size B, and possibly other parameters of the SGD variant (for example ADAM or RMSProp) are optimization hyperparameters. In addition, other and potentially more complex channel models may also be used in some exemplary embodiments. Furthermore, some exemplary embodiments may apply other training procedures, for example reinforcement learning if no channel model is available.

Figure 10:
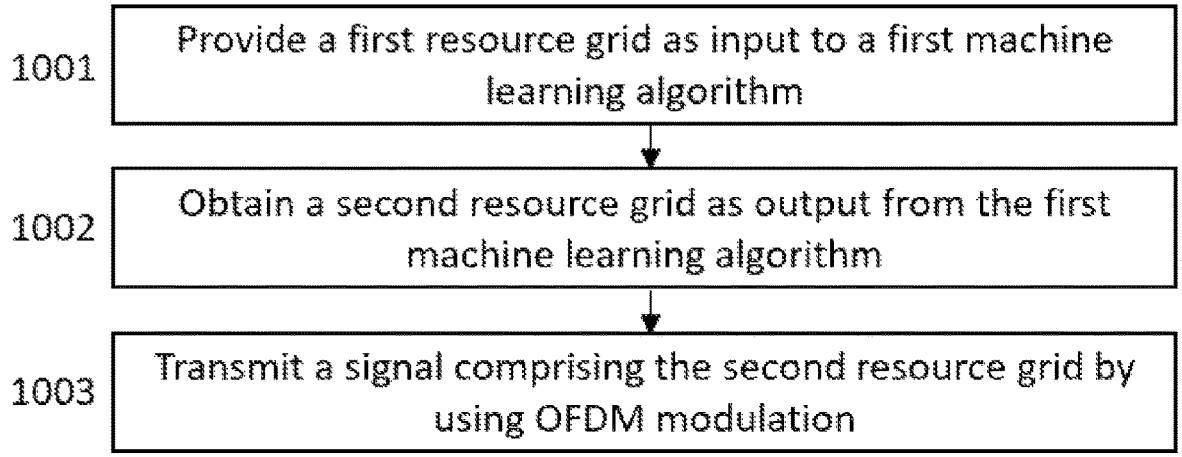

FIG. 10 illustrates a flow chart according to another exemplary embodiment. The functions illustrated in FIG. 10 may be performed by an apparatus such as a transmitter, or an apparatus comprising a transmitter. Referring to FIG. 10, a first resource grid is provided 1001 as input to a first machine learning algorithm. A second resource grid is obtained 1002 as output from the first machine learning algorithm. A signal comprising the second resource grid is transmitted 1003 by using OFDM modulation.

For example, the first resource grid may comprise a first set of complex data symbols in a data domain, and the second resource grid may comprise a second set of complex data symbols in a time-frequency domain.

The first machine learning algorithm may comprise a first artificial neural network. The first artificial neural network may comprise a first layer that is configured to convert the first set of complex data symbols to a set of real scalar values, and provide the set of real scalar values as input to a first convolutional layer of a plurality of convolutional layers. The first artificial neural network may further comprise a second layer that is configured to receive a filtered set of real scalar values via a second convolutional layer of the plurality of convolutional layers, and convert the filtered set of real scalar values to the second set of complex data symbols. The second convolutional layer may be the last convolutional layer of the plurality of convolutional layers. For example, the filtered set of real scalar values may be received directly from the second convolutional layer, or from another layer, such as a ReLu layer, between the second convolutional layer and the second layer. The first artificial neural network may further comprise a normalization layer that is configured to normalize the second set of complex data symbols before transmitting the signal comprising the second resource grid.

In another exemplary embodiment, the first resource grid may comprise a set of coded bits.

In another exemplary embodiment, the first resource grid may comprise one or more reference signals in a data domain.

In another exemplary embodiment, the second resource grid may comprise one or more reference signals in a time-frequency domain.

Figure 11:
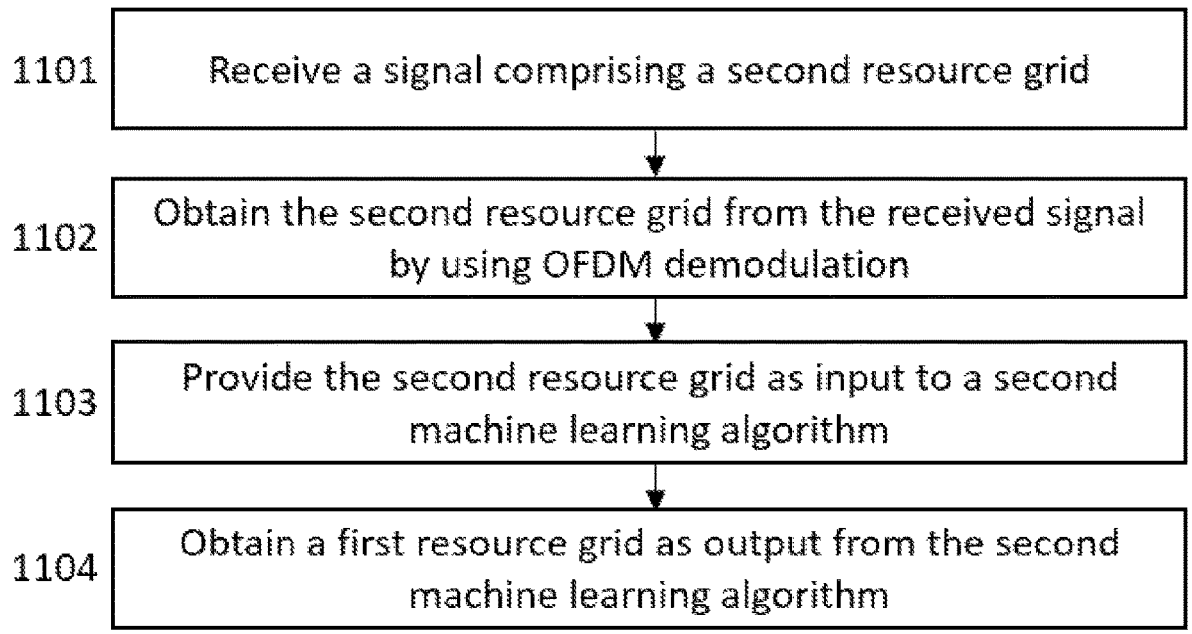

FIG. 11 illustrates a flow chart according to another exemplary embodiment. The functions illustrated in FIG. 11 may be performed by an apparatus such as a receiver, or an apparatus comprising a receiver. Referring to FIG. 11, a signal comprising a second resource grid is received 1101. The second resource grid is obtained 1102 from the received signal by using OFDM demodulation. The second resource grid is provided 1103 as input to a second machine learning algorithm. A first resource grid is obtained 1104 as output from the second machine learning algorithm.

For example, the first resource grid may comprise a first set of complex data symbols in a data domain, and the second resource grid may comprise a second set of complex data symbols in a time-frequency domain.

The second machine learning algorithm may comprise a second artificial neural network. The second artificial neural network may comprise a first layer that is configured to convert the second set of complex symbols to a set of real scalar values, and provide the set of real scalar values as input to a first convolutional layer of a plurality of convolutional layers. The second artificial neural network may further comprise a second layer that is configured to receive a filtered set of real scalar values via a second convolutional layer of the plurality of convolutional layers, and convert the filtered set of real scalar values to the first set of complex data symbols. The second convolutional layer may be the last convolutional layer of the plurality of convolutional layers. For example, the filtered set of real scalar values may be received directly from the second convolutional layer, or from another layer, such as a ReLu layer, between the second convolutional layer and the second layer.

In another exemplary embodiment, the first resource grid may comprise a set of log-likelihood ratios.

The functions and/or blocks described above by means of FIGS. 9-11 are in no absolute chronological order, and some of them may be performed simultaneously or in an order differing from the described one. Other functions and/or blocks may also be executed between them or within them.

A technical advantage provided by some exemplary embodiments is that they may enable more efficient utilization of the available radio resources, leading to a reduced bit error rate.

Figure 12:
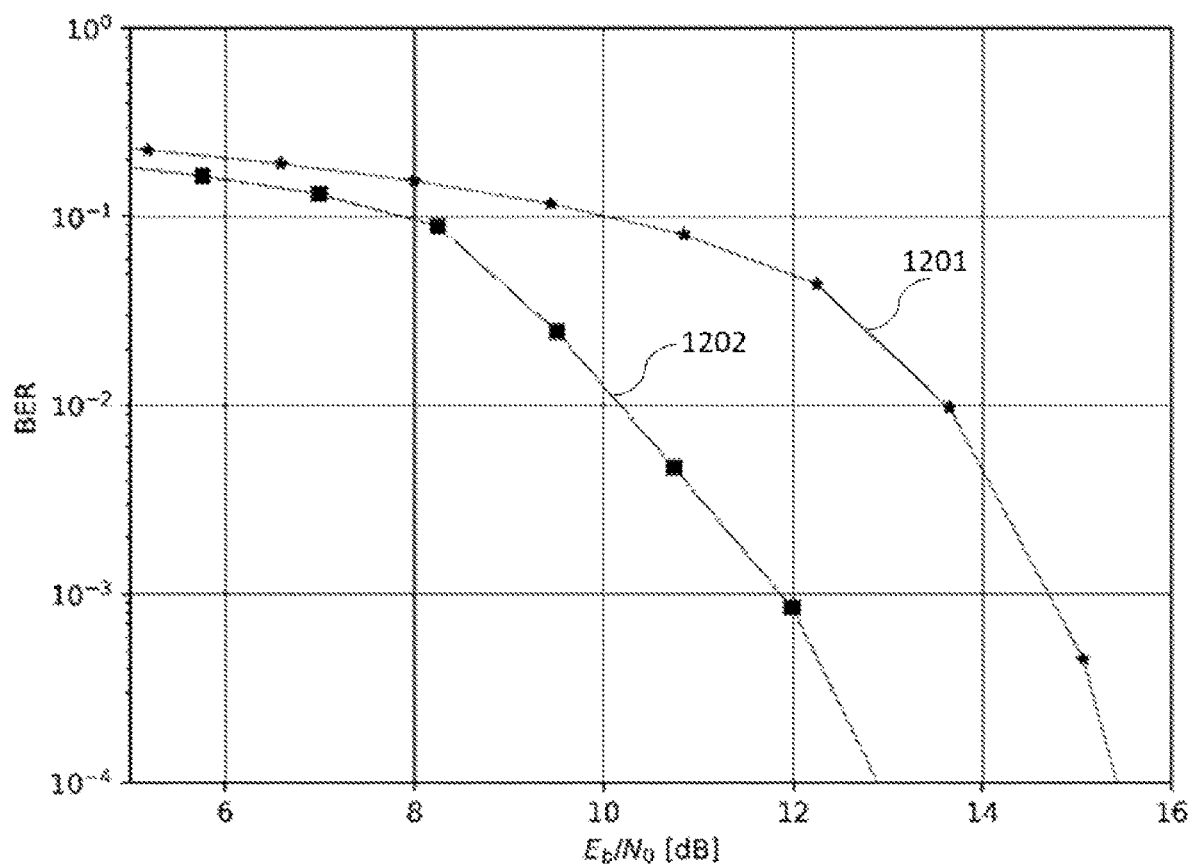
FIG. 12 illustrates simulated measurement results according to an exemplary embodiment.

FIG. 12 illustrates simulated measurement results according to an exemplary embodiment. FIG. 12 shows the bit error rates (BERs) achieved by two approaches as a function of signal-to-noise ratio (SNR). SNR may be defined as a ratio of average energy per bit ($E_b$) to noise spectral density ($N_0$). The upper line 1201 illustrates simulated measurement results achieved by baseline operation leveraging linear minimum mean squared error (LMMSE) channel estimation with perfect knowledge of the channel time-frequency correlations and Gaussian demapping, whereas the lower line 1202 illustrates simulated measurement results achieved by an exemplary embodiment. The simulations utilize third generation partnership project (3GPP) tapped delay line (TDL) models, 64-QAM modulation, and a pilot pattern and channel code with rate 2/3. A single-input single-output (SISO) system is considered herein. The carrier frequency is set to 2.6 GHz, and the subcarrier spacing to 15 kHz. As can be seen from FIG. 12, the exemplary embodiment enables significant gains of more than 2 dB at a BER of $10^{-3}$. The observed gains are due to both the improved processing at the transmitter and the learned receiver.

Figure 13:
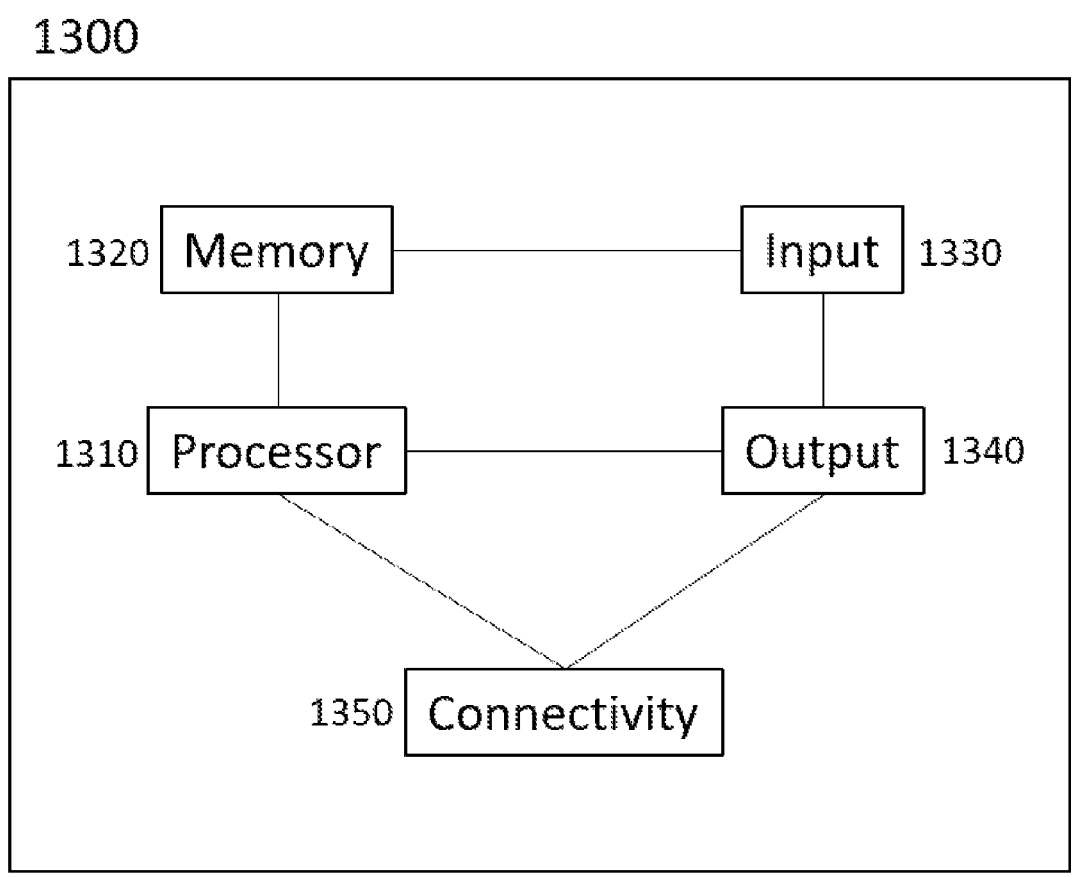
FIG. 13 illustrates an apparatus according to an exemplary embodiment.

FIG. 13 illustrates an apparatus 1300 according to an exemplary embodiment. The apparatus may be any communication device, such as a terminal device, or comprised in a communication device. The apparatus 1300 comprises a processor 1310. The processor 1310 interprets computer program instructions and processes data. The processor 1310 may comprise one or more programmable processors. The processor 1310 may comprise programmable hardware with embedded firmware and may, alternatively or additionally, comprise one or more application-specific integrated circuits (ASICs).

The processor 1310 is coupled to a memory 1320. The processor is configured to read and write data to and from the memory 1320. The memory 1320 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 1320 stores computer readable instructions that are executed by the processor 1310. For example, non-volatile memory stores the computer readable instructions and the processor 1310 executes the instructions using volatile memory for temporary storage of data and/or instructions.

The computer readable instructions may have been pre-stored to the memory 1320 or, alternatively or additionally, they may be received, by the apparatus, via an electromagnetic carrier signal and/or may be copied from a physical entity such as a computer program product. Execution of the computer readable instructions causes the apparatus 1300 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1300 may further comprise, or be connected to, an input unit 1330. The input unit 1330 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1330 may comprise an interface to which external devices may connect to.

The apparatus 1300 may also comprise an output unit 1340. The output unit may comprise or be connected to one or more displays capable of rendering visual content, such as a light emitting diode (LED) display, a liquid crystal display (LCD) and/or a liquid crystal on silicon (LCoS) display. The output unit 1340 may further comprise one or more audio outputs. The one or more audio outputs may be for example loudspeakers.

The apparatus 1300 further comprises a connectivity unit 1350. The connectivity unit 1350 enables wireless connectivity to one or more external devices. The connectivity unit 1350 comprises at least one transmitter and/or at least one receiver that may be integrated to the apparatus 1300 or that the apparatus 1300 may be connected to. The at least one transmitter comprises at least one transmission antenna, and the at least one receiver comprises at least one receiving antenna. The connectivity unit 1350 may comprise an integrated circuit or a set of integrated circuits that provide the wireless communication capability for the apparatus 1300. Alternatively, the wireless connectivity may be a hardwired application-specific integrated circuit (ASIC). The connectivity unit 1350 may comprise one or more components such as a power amplifier, digital front end (DFE), analog-to-digital converter (ADC), digital-to-analog converter (DAC), frequency converter, (de)modulator, and/or encoder/decoder circuitries, controlled by the corresponding controlling units.

The 1300 apparatus may further comprise training circuitry configured to carry out training of a machine learning model, for example of a neural network, according to some exemplary embodiments and, to this end, to carry out at least some of the functionalities described above by means of some exemplary embodiments using one or more individual circuitries.

It is to be noted that the apparatus 1300 may further comprise various components not illustrated in FIG. 13. The various components may be hardware components and/or software components.

As used in this application, the term "circuitry" may refer to one or more or all of the following:

a. hardware-only circuit implementations (such as implementations in only analog and/or digital circuitry) and b. combinations of hardware circuits and software, such as (as applicable):
   i. a combination of analog and/or digital hardware circuit(s) with software/firmware and
   ii. any portions of hardware processor(s) with software (including digital signal processor(s)), software, and memory(ies) that work together to cause an apparatus, such as a mobile phone, to perform various functions) and c. hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. A first apparatus, comprising:
at least one processor, and
at least one memory including computer program code, wherein the at least one memory and the computer program code are configured, with the at least one processor, to cause the first apparatus to:
provide a first resource grid as input to a first machine learning algorithm;
obtain a second resource grid as output from the first machine learning algorithm;
transmit a signal comprising the second resource grid by using orthogonal frequency-division multiplexing modulation;
wherein the first resource grid comprises a first set of complex data symbols in a data domain, and the second resource grid comprises a second set of complex data symbols in a time-frequency domain;
wherein the first machine learning algorithm comprises a first artificial neural network, wherein the first artificial neural network comprises at least a plurality of convolutional layers;
wherein the first artificial neural network further comprises a first layer that converts the first set of complex data symbols to a set of real scalar values, and provides the set of real scalar values as input to a first convolutional layer of the plurality of convolutional layers;
wherein the first artificial neural network further comprises a second layer that receives a filtered set of real scalar values via a second convolutional layer of the plurality of convolutional layers, and converts the filtered set of real scalar values to the second set of complex data symbols; and
wherein the first artificial neural network further comprises a normalization layer that normalizes the second set of complex data symbols before transmitting the second resource grid.

2. The first apparatus according to claim 1, wherein the second convolutional layer has two channels.

3. A second apparatus, comprising:
at least one processor, and
at least one memory including computer program code, wherein the at least one memory and the computer program code are configured, with the at least one processor, to cause the second apparatus to:
receive a signal comprising a second resource grid;
obtain the second resource grid from the received signal by using orthogonal frequency-division multiplexing demodulation;
provide the second resource grid as input to a second machine learning algorithm;
obtain a first resource grid as output from the second machine learning algorithm;
wherein the first resource grid comprises a first set of complex data symbols in a data domain, and the second resource grid comprises a second set of complex data symbols in a time-frequency domain;
wherein the second machine learning algorithm comprises a second artificial neural network, wherein the second artificial neural network comprises at least a plurality of convolutional layers;
wherein the second artificial neural network further comprises a first layer that converts the second set of complex symbols to a set of real scalar values, and provides the set of real scalar values as input to a first convolutional layer of the plurality of convolutional layers; and wherein the second artificial neural network further comprises a second layer that receives a filtered set of real scalar values via a second convolutional layer of the plurality of convolutional layers, and converts the filtered set of real scalar values to the first set of complex data symbols.

4. A method, comprising:

providing a first resource grid as input to a first machine learning algorithm;

obtaining a second resource grid as output from the first machine learning algorithm;

transmitting a signal comprising the second resource grid by using orthogonal frequency-division multiplexing modulation;

wherein the first resource grid comprises a first set of complex data symbols in a data domain, and the second resource grid comprises a second set of complex data symbols in a time-frequency domain;

wherein the first machine learning algorithm comprises a first artificial neural network, wherein the first artificial neural network comprises at least a plurality of convolutional layers;

wherein the first artificial neural network further comprises a first layer that converts the first set of complex data symbols to a set of real scalar values, and provides the set of real scalar values as input to a first convolutional layer of the plurality of convolutional layers;

wherein the first artificial neural network further comprises a second layer that receives a filtered set of real scalar values via a second convolutional layer of the plurality of convolutional layers, and converts the filtered set of real scalar values to the second set of complex data symbols; and wherein the first artificial neural network further comprises a normalization layer that normalizes the second set of complex data symbols before transmitting the second resource grid.

* * * * *